(No Model.) 9 Sheets—Sheet 3.

H. SCHAAKE.
CAN SOLDERING APPARATUS.

No. 548,464. Patented Oct. 22, 1895.

Witnesses.
F. Monteverde
W. N. Cobb.

Inventor.
Henry Schaake
by Aacker
atty (No Model.)
9 Sheets—Sheet 5.

H. SCHAAKE.
CAN SOLDERING APPARATUS.

No. 548,464. Patented Oct. 22, 1895.

Witnesses.
P. E. Monteverde.
W. H. Cobb.

Inventor.
Henry Schaake.
by R. A. Parker
atty (No Model.) 9 Sheets—Sheet 6.
H. SCHAAKE.
CAN SOLDERING APPARATUS.

No. 548,464. Patented Oct. 22, 1895.

Witnesses.
J. E. Monteverde.
W. H. Cobb.

Inventor.
Henry Schaake.
by V. A. Acker
atty (No Model.) 9 Sheets—Sheet 7.

H. SCHAAKE.
CAN SOLDERING APPARATUS.

No. 548,464. Patented Oct. 22, 1895.

Witnesses.
Inventor.
Henry Schaake (No Model.) 9 Sheets—Sheet 8.

H. SCHAAKE.
CAN SOLDERING APPARATUS.

No. 548,464. Patented Oct. 22, 1895.

Witnesses.
Inventor.
Henry Schaake (No Model.) 9 Sheets—Sheet 9.
H. SCHAAKE.
CAN SOLDERING APPARATUS.
No. 548,464. Patented Oct. 22, 1895.

Witnesses.
F. E. Monteverde.
N. N. Cobb.

Inventor.
Henry Schaake
by F. A. Acker
atty

UNITED STATES PATENT OFFICE.

HENRY SCHAAKE, OF SAN FRANCISCO, CALIFORNIA.

CAN-SOLDERING APPARATUS.

SPECIFICATION forming part of Letters Patent No. 548,464, dated October 22, 1895.

Application filed March 17, 1894. Serial No. 504,092. (No model.)

*To all whom it may concern:*

Be it known that I, HENRY SCHAAKE, a citizen of the United States, residing at San Francisco, in the county of San Francisco and State of California, have invented certain new and useful Improvements in Can-Soldering Apparatus; and I do hereby declare the following to be a full, clear, and exact description of said invention, such as will enable others skilled in the art to which it most nearly appertains to make, use, and practice the same.

This invention has relation to an improved can-soldering machine or apparatus which consists in the arrangement of parts and details of construction as will be hereinafter more fully set forth in the drawings, described in the specification, and pointed out in the claims.

In the practical working of can-machinery it has been demonstrated that the metal, after the heads are placed upon the body, springs somewhat when the can is rolled within the molten bath of solder in order to solder the heads thereon, the springing of which metal is caused by the heating thereof while run through the bath. This spring of the metal tends to displace the heads to a certain degree. Consequently the heads are not as solidly secured to the body as would be the case if the heads were firmly held in place during the soldering process. Hence the can when completed is not sufficiently strong to resist the proper amount of pressure. By this statement it is not desired to convey the impression that all the cans rolled within the solder bath spring sufficiently to displace the heads, for such is not the case; but a great many do, and this number is sufficient to cause considerable expense in repairing such of the cans as are disclosed by the tester-machine to contain leaks.

My invention consists in providing a machine which will receive the can-bodies as fed thereto from the heading-machine between swinging retaining-clamps constructed to hold the can-heads firmly in place upon the can-body and to prevent the displacement thereof in case the metal should spring during the process of soldering; cause the body to be thrown at an angle and rotated through a bath of molten solder in order to secure the heads to the body; throw the retaining-clamp into a vertical position after the can has been carried through the solder bath, so as to permit the fresh solder to flow into and fill any space which might possibly exist between the flange of the head and outer wall of the body, holding the can-body in this position until the solder has become cool, and after becoming cool placing the retaining-clamp in a horizontal position; automatically releasing the retaining-clamp and depositing the can carried thereby into the swinging can-seat of a turn-table, which table is carried around so as to reverse the position of the can, in order to place the unsoldered or free end thereof in line with the second solder bath; mechanism for automatically operating the retaining-clamp so as to take the can from the swinging seat after the position thereof has been reversed, causing the clamp to be swung at an angle to the bath and to rotate the free end of the can within the bath, raising the retaining mechanism to a vertical position and maintaining it in this position until the solder has become cooled, thence throwing the same into a horizontal position, and causing the clamp to be released, so as to discharge the soldered can from the machine.

The foregoing sufficiently sets forth the main features of my invention, and in order to more fully comprehend the working thereof reference must be had to the accompanying sheets of drawings, which form a part of my application.

Fig. 11 is an end elevation of the device set forth in Fig.

10 viewed from the guide-roll end, showing a portion of the carrier-chain.

The letter A is used to indicate the base of the machine, to which the open frame-plate A′ is connected by means of the upright $A^2$. At each end of this frame-plate I locate the wheels B B′, from each of which project a series of arms $B^3$. These arms have the grooves or notches $a$ cut in the outer ends thereof. Over these wheels travels the endless belt or chain which carries the can-carrier truck or frame around. This belt or chain consists of a series of links or rods C C′, the ends of one of which terminate in male joints $b$ and the other in female joints $b'$, the two being joined together by vertical pin or bolt $C^2$, the ends of which project above and below the belt and fit within the sockets or grooves or notches $a$ cut in the wheels B B′, by means of which the belt or chain is carried around as the wheels rotate. These wheels are secured to shafts D D′, the shaft D having its bearing in a sliding plate $D^2$, adjustably secured to base A by means of screw-bolt $c$. The upper end projects through the sleeve $D^3$ and to the upper end is secured the wheel B. This sleeve is a part of slide plate $c'$, which is connected to plate $c^2$ by screw-bolt $c^3$. By thus securing the shaft D the wheel B may be adjusted to take up any slack which might take place in the endless belt.

The wheel B is rotated through the medium of the chain or belt, which is carried around by the rotation of the wheel B′. The shaft D′, to which this wheel is secured, projects below the frame A′ and has the crown-wheel E fastened to its lower end. This crown-wheel intermeshes with pinion E′, fixed to cross-shaft $E^2$. Motion is imparted to the cross-shaft by the pulley-wheel $E^3$, secured to shaft $E^6$, the motion of which shaft is transmitted to $E^2$ by means of pinion $E^4$, which intermeshes with gear-wheel $E^7$, rigidly secured to cross-shaft $E^2$, and the rotation of said shaft is transmitted to vertical shaft D′ through the medium of the crown-wheel E and pinion E′. Vertical shaft D′ is held in position by means of collar $E^5$, which bears upon the upper face of frame-plate A′. As the wheel B′ is rotated the projecting ends of pin $C^2$ fit within the sockets or notches cut in the ends of the arms $B^3$, and the belt or chain is thus carried around, the travel of which imparts motion to the wheel B.

The rods or links C C′, which constitute the endless belt or chain, are made round a portion of their length, as shown, and upon this portion swings the truck-frame F, which is suspended therefrom at right angles to the belt or chain by means of the fastening-plate $e$, which fits over the rounded portion of the links or rods and is secured to the frame F by bolts $e'$. The under face of this plate and the upper face of the frame I cut away to correspond with the curve of the links. Hence the frame may freely swing upon the rounded portion of said rods or links. From the frame downwardly extend the curved arms F′, which arms are cast integral with the frame, and between these arms I locate the clamp-heads $F^2$ $F^3$, from which heads project the shafts $F^4$ $F^5$, said shafts extending through an opening formed within the lower portion of each of the curved arms. To the outer end of the shafts I secure the rolls G G′. To the inner portion of shaft $F^5$ is fastened the collar $G^2$, which, in connection with rolls G′, holds the said shaft and clamping-head $F^3$ in a fixed position, by which is meant no lateral play is permitted.

Clamping-head $F^2$ has an annular groove $f$ cut in the shoulder thereof, within which fits the forked end F″ of the lever $f^2$. The upper end of this lever is rigidly secured to shaft $g$, which works through ears $g'$ $g^2$, projecting upwardly from frame F. To the opposite end of this shaft is secured the collar $g^3$, and between this collar and outer face of ear $g^2$ is secured around the shaft the spiral spring $g^4$. It will be noticed that the lever $f^2$ projects through an elongated opening $g^5$, cut within the frame F. Consequently as the shaft $g$ is moved in or out by the expansion or contraction of the spiral spring the clamping-head $F^2$ is likewise carried by the movement of the lever $f^2$, the upper end of which is fixed to the sliding shaft and the lower of which straddles the shoulder of the head by fitting within the annular groove. In this manner the clamp-head $F^2$ is carried in or out in order to hold a can-body or to release one, the sliding bar being operated by the hereinafter-described can mechanism.

The rolls G G′ travel upon the track K K′.

Figure 1:
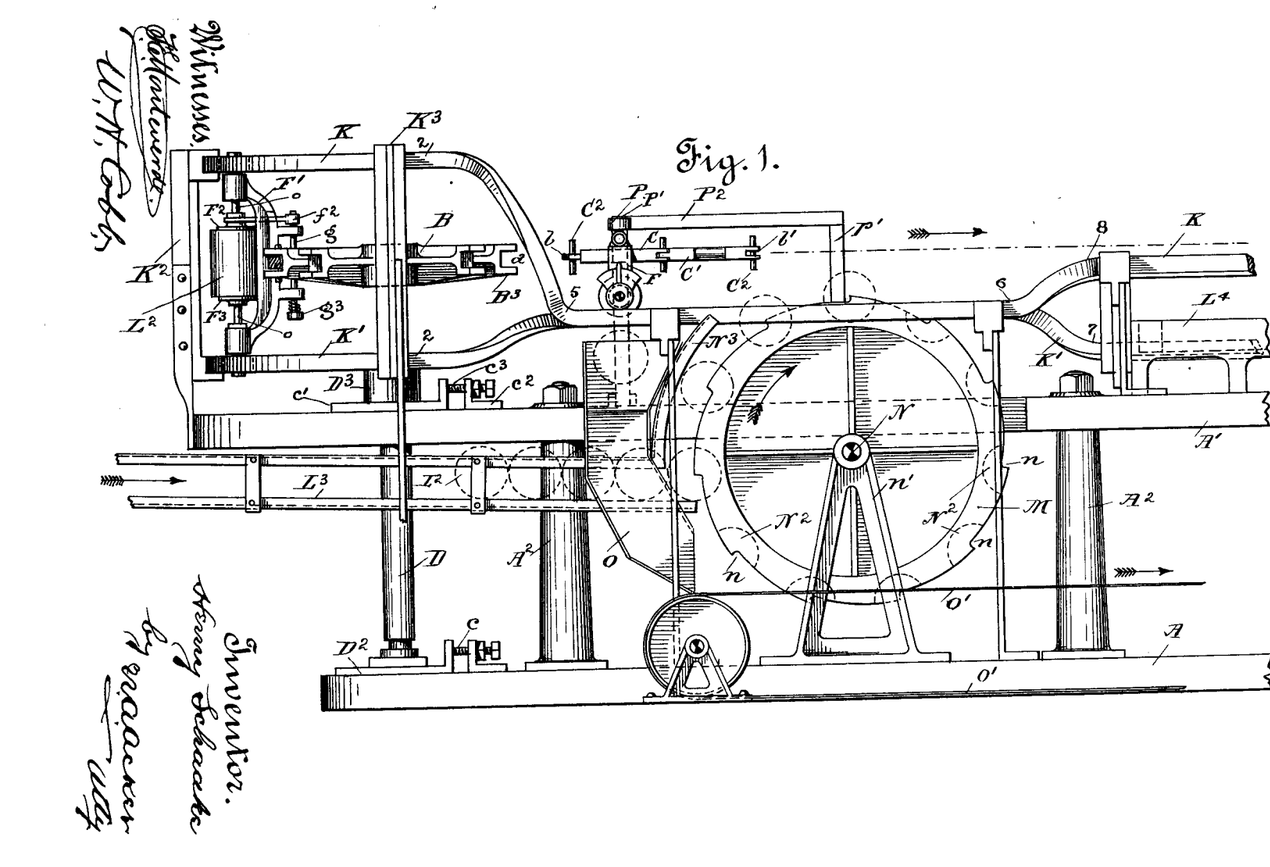
Figure 1 is a broken side elevation of the machine.
Figure 2:
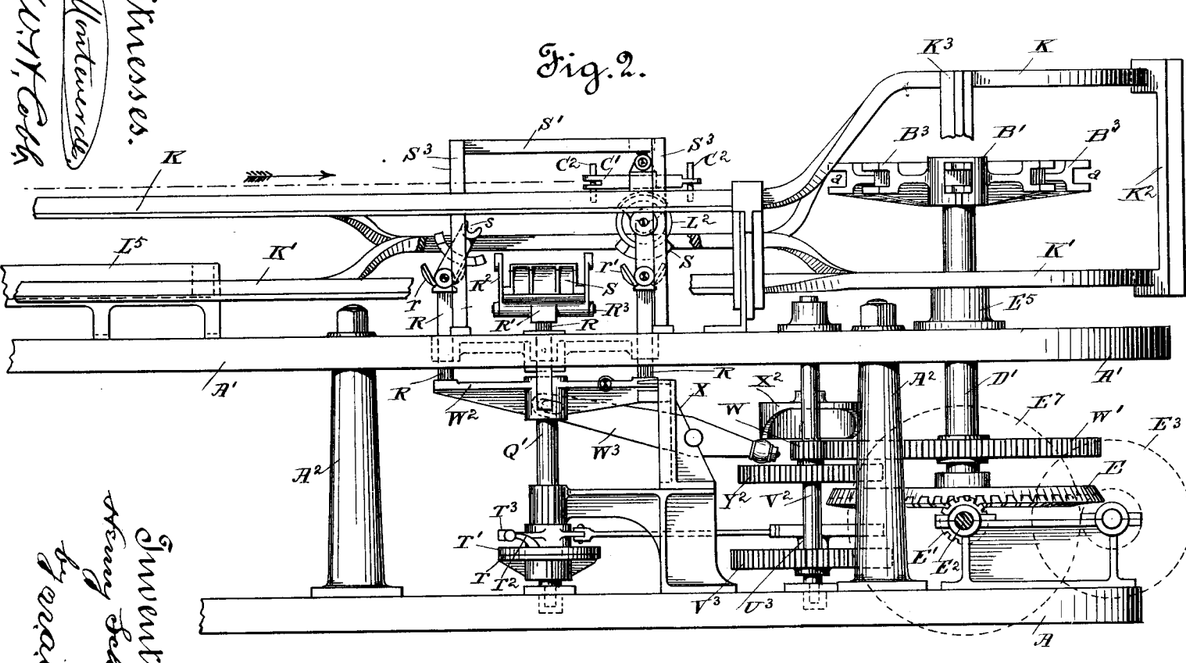
Fig. 2 is a similar view of the opposite end of the machine, being a continuation of Fig. 1.
Figure 3:
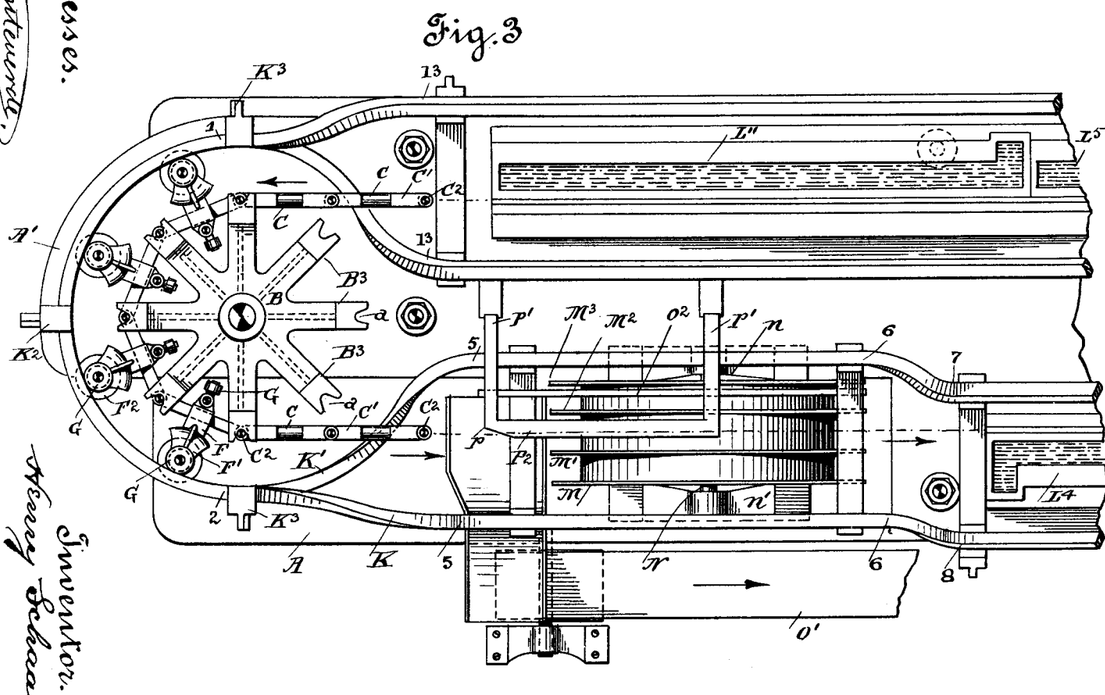
Figs. 3 and 4, top plan views of Figs. 1 and 2, respectively.
Figure 4:
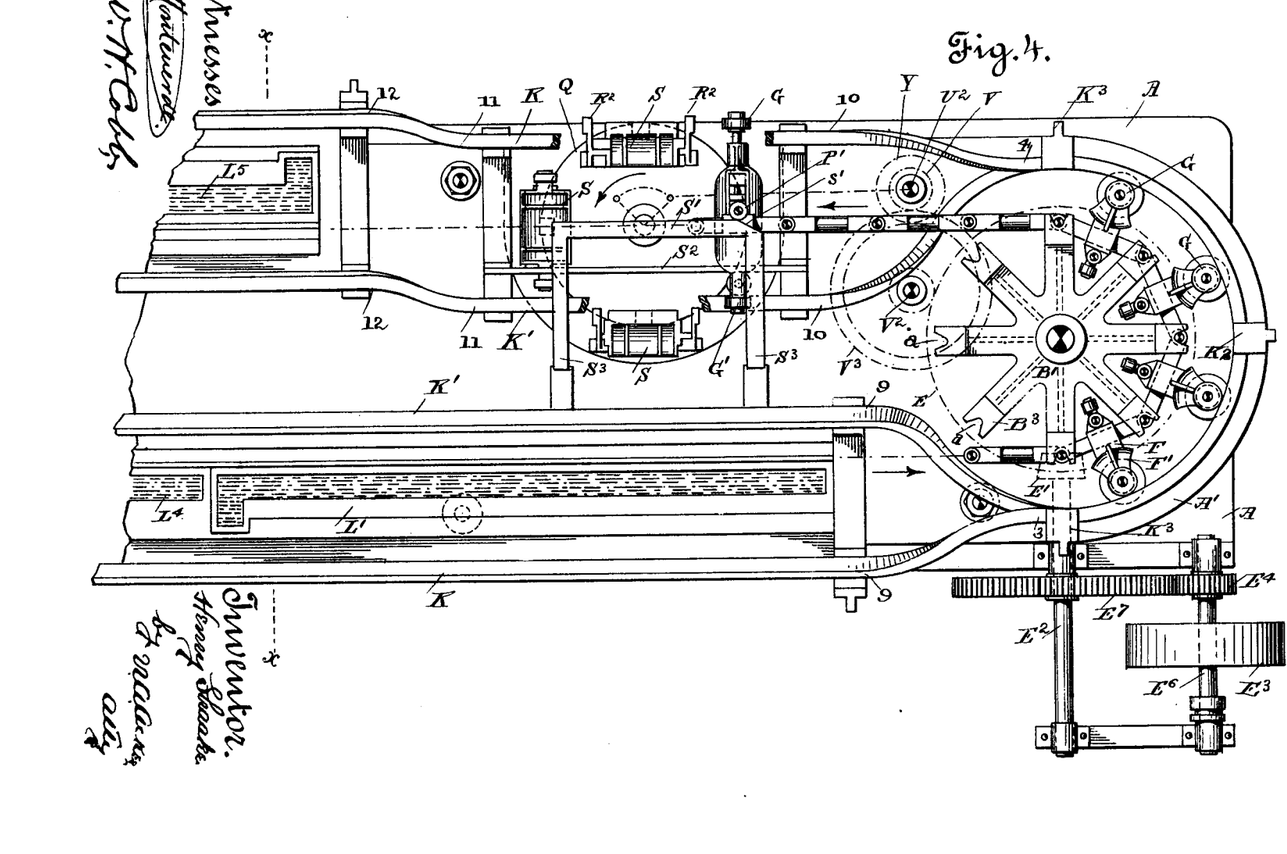
Figure 15:
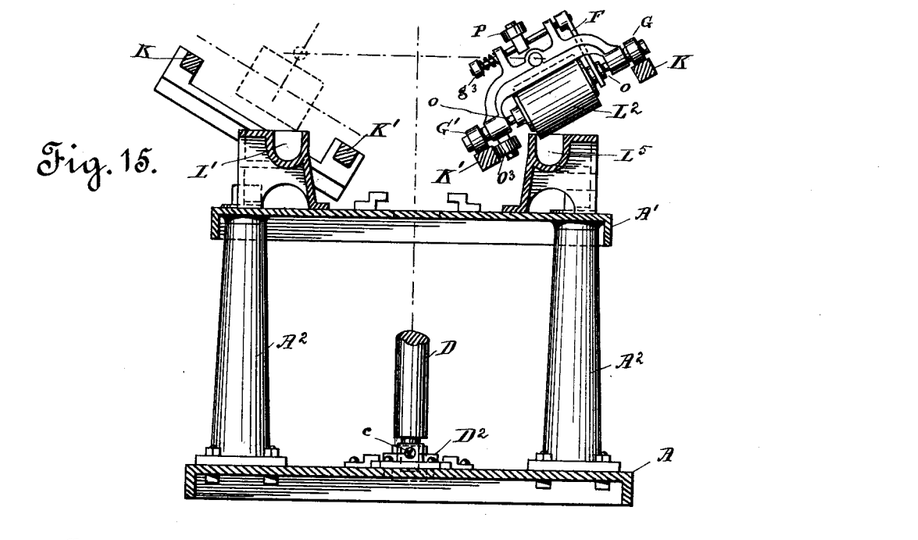
Fig. 15 is a cross-sectional elevation taken on line $x$ $x$, Fig. 4, showing position of solder baths, of carrier-trucks when end of can is being rolled within the baths, and location of tracks upon which the carrier trucks or frames travel.
Figure 16:
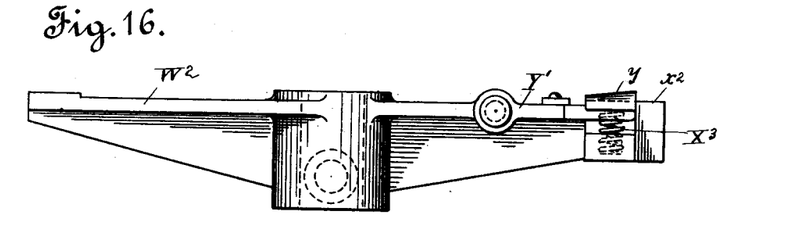
Fig. 16 is an enlarged detail side elevation of the plate for elevating the can-seats carried by the turn-table.
Figure 17:
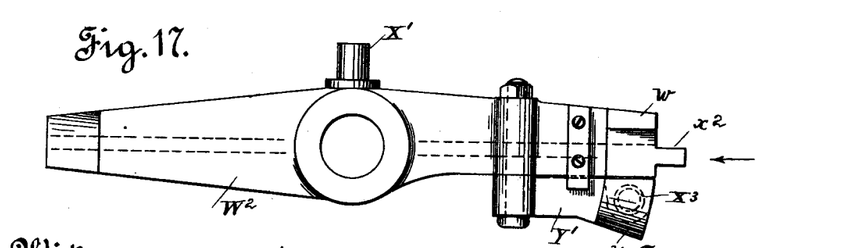
Fig. 17 is a top plan of Fig. 16.
Figure 18:
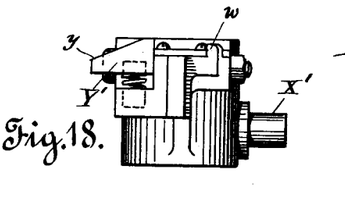
Fig. 18 is an end view in elevation of the lift-plate shown in Fig. 17 viewed in direction of arrow.
Figure 19:
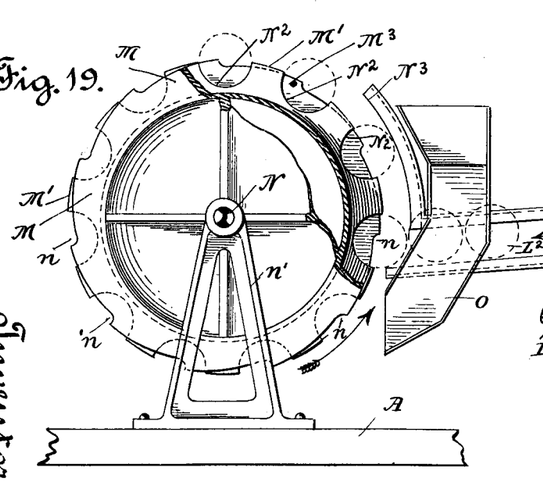
Fig. 19 is a side view in elevation, partly broken away, of the carrier-wheel which receives the can-bodies from the feed-chute and delivers the same to the machine.
Figure 20:
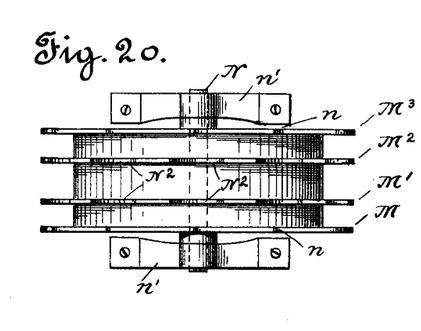
Fig. 20 is a top plan view of the carrier-wheel.
Figure 21:
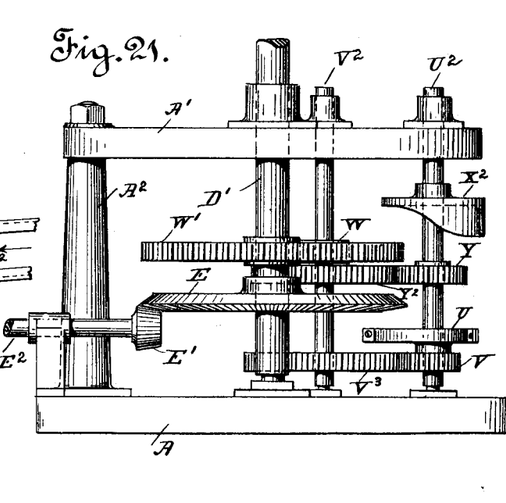
Fig 21 is a detail view in elevation showing the drive mechanism.
Figure 22:
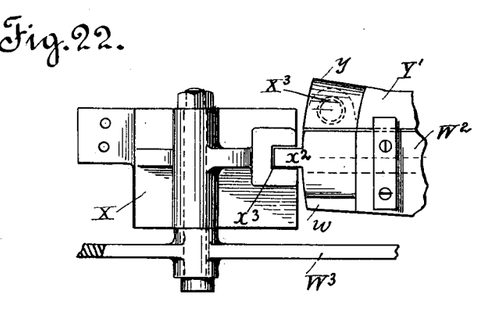
Fig. 22 is a detail broken top plan view showing the lift-plate for raising and lowering the vertical rods.

As the rolls travel upon the tracks the same are rotated by contact therewith, which imparts a rotary motion to the shafts $F^4$ and $F^5$ and clamping-heads $F^2$ and $F^3$. Inasmuch as the can-body is held between these clamping-heads it is obvious that as the heads rotate the can-body will be revolved therewith. The tracks K K' extend entirely around the frame-plate A', and they are run in such a manner that between certain points the truck or carrier frame is swung in a vertical plane, between others in a horizontal one, and between others at an angle of about forty-five degrees, more or less. These tracks are held in place above the frame-plate by brackets $K^2$ $K^3$, (see Figs. 1, 2, 3, and 4,) and between the points 1 2 and 3 4 (see Figs. 1, 2, 3, and 4) they run one above the other, so that the truck-frame, clamp-heads, and can travel in a vertical plane. This is for the purpose of enabling the solder to settle and cool around the can-head flange without displacement. From point 2 track K' gradually curves upward and inward to point 5, from whence it runs in a straight line to point 6, the track K gradually curving downwardly until the two are in the same line, whence this track runs parallel with track K' until point 6 is reached. (See Figs. 1 and 3.) As the truck or carrier frame travels over this portion of the track it hangs in a horizontal position. Track K' runs from 6 to 7 at a slight curve downward and at the same time is gradually tilted until it stands at an angle of forty-five degrees, while track K runs to point 8 and gradually curves upward and is also gradually tilted. From thence to point 9 the two tracks run parallel and stand in relation to each other as shown in Fig. 15, the truck or carrier frame being carried at an angle of about forty-five degrees.

There is secured to the frame-plate A, between the points 7 and 9, (see Fig. 4,) the flux-bath frame $L^4$ and solder-bath frame L', which contains the molten solder. Consequently while the truck or carrier frame is being carried over this portion of the tracks the lower edge of the can-body is being rotated within the solder bath. As the tracks are run from 9 to 3, the lower one or track K' is gradually curved outward until it comes directly beneath track A, at the same time being tilted or twisted over until its face is perpendicular, the track K being curved upward and likewise tilted or twisted. The tracks run in this relation to each other until the point 4 is reached. The truck or carrier frame while passing over this portion of the track swings into a vertical plane. Between points 4 and 10 the tracks run the same as between 2 and 5, which throws the truck-frame into a horizontal position, which it maintains while traveling over the tracks until point 11 is reached, and from this point to point 12 the tracks run the same as between 6 8 and 6 7. Between 12 and 13 the tracks run parallel to each other, but so tilted as to cause the truck or carrier frame to assume an angle of about forty-five degrees, the same as between 7 9 and 8 9. The run of the tracks between 13 and 1 is identical with the position of the tracks between 9 and 3, while between 1 and 2 the tracks stand in relation with each other as between 3 and 4. Between the points 12 and 13 is located a second flux-bath frame $L^5$ and solder-bath frame L'', within which the molten solder is held. This bath is for soldering the opposite end of the can-body to that soldered by bath within frame L. The object of throwing the truck or carrier frame into a vertical position after the can has passed through the bath is to assure the cooling of the solder around the joint. After reaching point 4, Fig. 4, the frame is thrown into a horizontal position for the purpose of enabling the can-body to be reversed, which is done by hereinafter-described mechanism, so as to permit the opposite end of the can to be passed through the second solder bath.

It will be observed that the can $L^2$ is held between the clamping-heads $F^2$ $F^3$, carried by the truck or carrier frame, during the entire operation of soldering. Consequently it is impossible for the can-head to become displaced should the metal have a tendency to spring by reason of the heat of the solder. By soldering the ends of the can while the same is held between clamps which exert a constant inward pressure upon the heads during the operation of soldering and maintaining the pressure thereon until after the heads have become securely united by the cooling of the solder a joint is produced which is perfect and the expense now attached to the tinkering or repairing of an imperfect end or head joint is obviated.

To one side of the machine, near the forward end, is run the feed-chute $L^3$, which conveys the cans to be soldered to the carrier-wheel. This wheel is composed of four flanged disks M M' $M^2$ $M^3$, mounted upon the shaft N. This shaft works within bearing of brackets n'. The two inner disks have the flanges cut away, so as to form a series of can-seats $N^2$ around the face of the carrier-wheel, into which the cans from the can feed-chute enter as the carrier-wheel revolves. The flanges of the two outer disks act as guards in order to prevent the displacement of the cans from within the seats of the carrier-wheel by lateral displacements.

While I have described the carrier-wheel as being composed of four disks united together upon the same shaft, it is obvious that the wheel, if so desired, may be formed solid and the can-seats cut within the face thereof. However, I prefer the style of carrier-wheel described, not only on account of its cheapness, but likewise for the lightness thereof. The flange of the outer disk I serrate, as shown at n, by means of which serrations the carrier-wheel is revolved.

In order to hold the cans within the seat of the carrier-wheel while the wheel is being rotated, I provide the curved guard-plate N³, which extends upwardly from the end of the feed-chute L³. As the truck-frame starts to travel over the tracks in a horizontal position between the points 5 and 6 (see Figs. 1 and 3) the clamping-head F² is moved outward and releases such can as may be held between the clamping-heads and permits same to fall into discharge-chute O, from which it is carried by endless belt O'. This unlocking of the clamping-heads is caused by the roll P, secured to the stud P', projecting from the slide-shaft $g$, to which it is rigidly secured, riding upon the inclined face $p$ of the cam-rod P². This cam-rod is held a slight distance above and in front of the trackways by brackets $p'$. As the roll travels upon the inclined face of the slide-bar $g$ it is moved outward, which carries the clamping-head F² therewith through the medium of the connecting forked lever $f^2$, which unites the two, as before described. The clamping-heads remain open, while the cam-roll P bears upon the face of the cam-rod. The moment the clamping-head begins to move outward the can held between the heads is released. As the swinging truck or carrier frame is conveyed forward, with its clamping-heads open, the serrated flanges of the carrier-wheel are engaged by the free portion $o$ of the clamp-head rods F⁴ F⁵, and the wheel is thus carried forward or rotated, the can-body resting within its seat being situated between the open clamping-heads. After the carrier-belt has conveyed the truck and carrier frame sufficiently far to cause the roll P to move off the cam-rod the resiliency of spring $g^4$ draws the slide-rod $g$ inward and the clamping-head F² therewith. The heads thus automatically close upon the can and convey the same with the movement of the endless carrier-belt from within its seat in the carrier-wheel to the flux and solder bath.

Figure 9:
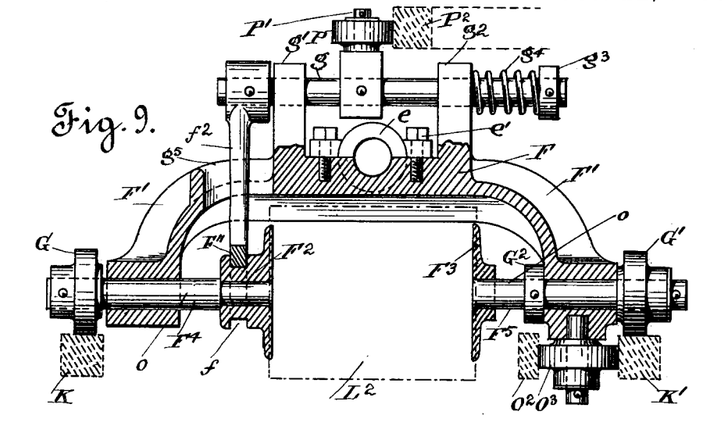
Fig. 9 is a view of one of the can-carrier trucks or grooves in front elevation with part of frame and clamp-heads in section.
Figure 10:
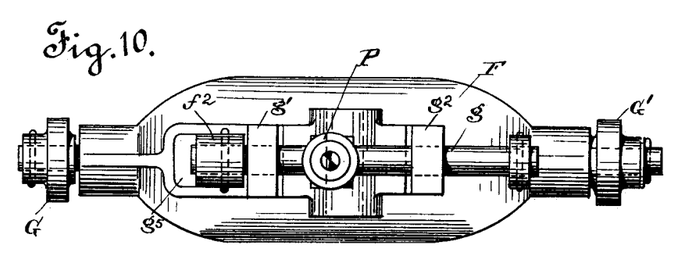
Fig. 10, top plan of Fig. 9.
Figure 11:
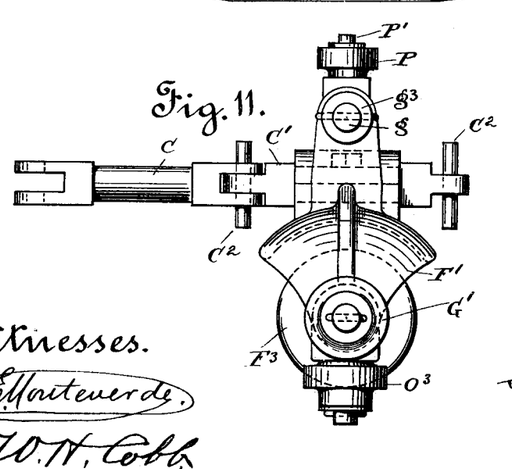
Figure 12:
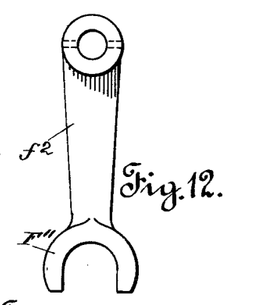
Fig. 12 is a detail view of the forked lever for releasing the clamp-head.

In order to overcome the tendency of the entire truck or carrier frame to move outward when the roll P enters upon the cam-rod P², which if it did would fail to open the clamp-heads in order to release the can, I provide the supplemental track O², which runs parallel with the track K' the entire distance of the cam-rod. Between these two tracks runs the keeper-roll O³, (see Fig. 9,) which holds the truck-frame immovable during the outward movement of the slide-rod and clamp-head before described.

There being a truck or carrier frame suspended from each link of the endless carrier belt or chain, it is obvious that the carrier-wheel is being continuously rotated, cans removed therefrom, and soldered cans discharged from between the clamp-heads.

The keep-roll O³ is always in contact with the track K' and maintains the truck or carrier frame thereon in whatever position the same may be suspended.

Figure 13:
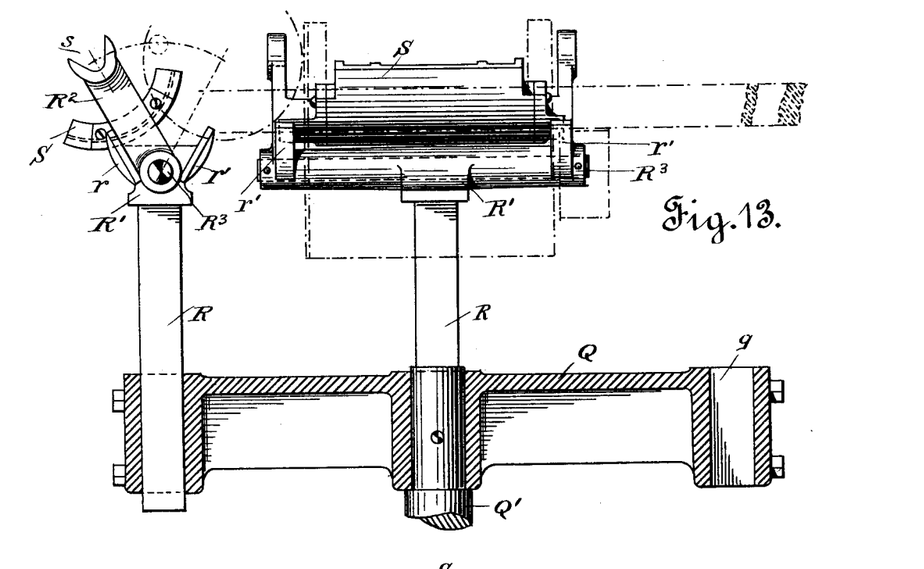
Fig. 13 is a detail elevation of the reversing device for the cans, showing two of the swinging seats which receive the cans as released from between the clamp-heads, one of the seats being shown in side elevation and the other in end elevation, the turntable being in section.
Figure 14:
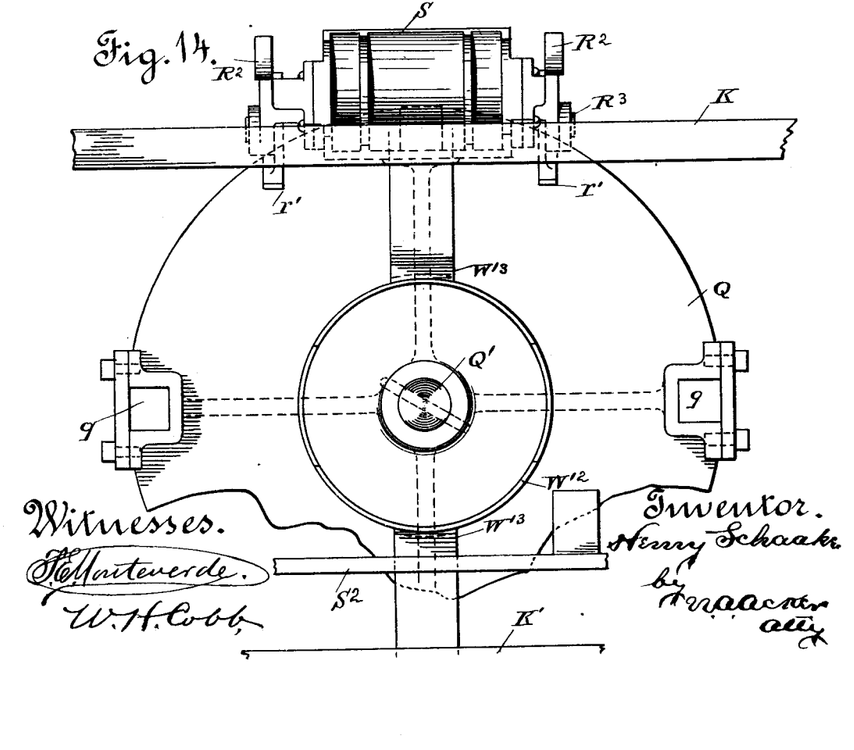
Fig. 14, a top plan of Fig. 13 with one of the seats removed, the table being partly broken away.

After the can has been rotated through the entire flux and solder baths contained in the flux and solder bath frames and the can carried within the machine to point 10 in order to cool the solder, it becomes necessary to reverse the position of the can, so as to permit the soldering of the opposite end. For this purpose I provide a reversing device which consists of the platform or turn-table Q, rigidly fastened to the vertical shaft Q'. Within this platform, disk, or turn-table I provide four openings $q$, through which work the vertical rods R, four in number, the upper ends of which terminate in the hub R', the outer ends of which hubs are provided with the upwardly-extending ears $r$ $r'$. To this hub are movably secured the arms R² by bolt R³. Between these arms I secure the can-seat S, which seat is swung forward with the movement of the arms R². These seats are arranged opposite each other, and the movement of the turn-table, which is an intermittent one, is so regulated that two of the seats are always in line with the endless traveling carrier-belt. (See Fig. 4.) The rods R move vertically and two are raised at a time, and when two are up the remaining two are down. It is necessary to raise the rods in order to bring the can-seats in line to receive the cans from between the clamp-heads when released and to permit the clamp-heads to receive the cans therefrom after the same have been reversed. The upper ends of the arms R² have the V-shaped notches $s$ cut therein, which are engaged by the free portions $o$ of the clamp-head rods. When the rods R move the full upward distance, the seat S, movably secured between the arms R² of said rods, will be in line with the endless carrier belt or chain. Inasmuch as only two of the rods R are raised at the same time, it is obvious that only two of the seats are in line with the endless traveling belt or chain, one of which contains the can-body in its reversed position, the other being empty, so as to receive a body from between the clamp-heads of the truck or carrier frame, as will be hereinafter more fully described. As the belt or chain travels, the rods of the clamp-heads carried by the truck or carrier frame engage with the notched ends of the arms R² and swing the same over until the clamp-head rods move from engagement therewith, the can-seat being swung or tilted with the arms; but the arms are prevented from swinging over beyond a certain distance by the guard-ears $r$ $r'$, with which the arms contact, as shown in Fig. 13. As the rods of the clamp-heads move into engagement with the swinging arm R² the cam-roll P runs upon the incline portion $s'$ of the cam-rod S' and moves the slide-rod $g$ and clamp-head F² outward, which releases the can held between the heads and deposits the same in one of the swinging can-seats. The truck or carrier frame is prevented from lateral movement while the clamp-heads are being unlocked by the keeper-roll O³ traveling between the track K' and supplemental track S². The cam-rod S' is held in place by brackets $S^3$. After the can has been placed in the can-seat the same is lowered so as to clear the traveling truck or carrier frame and a quarter-rotation is imparted to the turn-table by the hereinafter described mechanism which places the can-seat in a position parallel with the traveling-carrier chain. By the time the truck or carrier frame reaches a point opposite to that where it deposited the can-body (being carried by the endless carrier belt or chain) the turn-table will have been given another quarter rotation, so as to bring the arms $R^2$ in line with the clamp-head rods, which again engage therewith and carry same over until the rods move out of engagement with the notched end. The position of the can-body held within the seat will thus be reversed and the free or unsoldered end be in line with the second solder bath. As the cam-roll P moves off the cam-rod the resiliency of spring $g^4$ forces the slide-rod and clamp-head $F^2$ inward, so as to grasp the can between the clamp-heads. The can-body having been again grasped between the clamping-heads of the carrier-truck, after being reversed, will be removed from its seat by the travel of the endless carrier-chain and its unsoldered or free end carried through the second flux and solder baths.

Figures 5, 6, 7, 8:
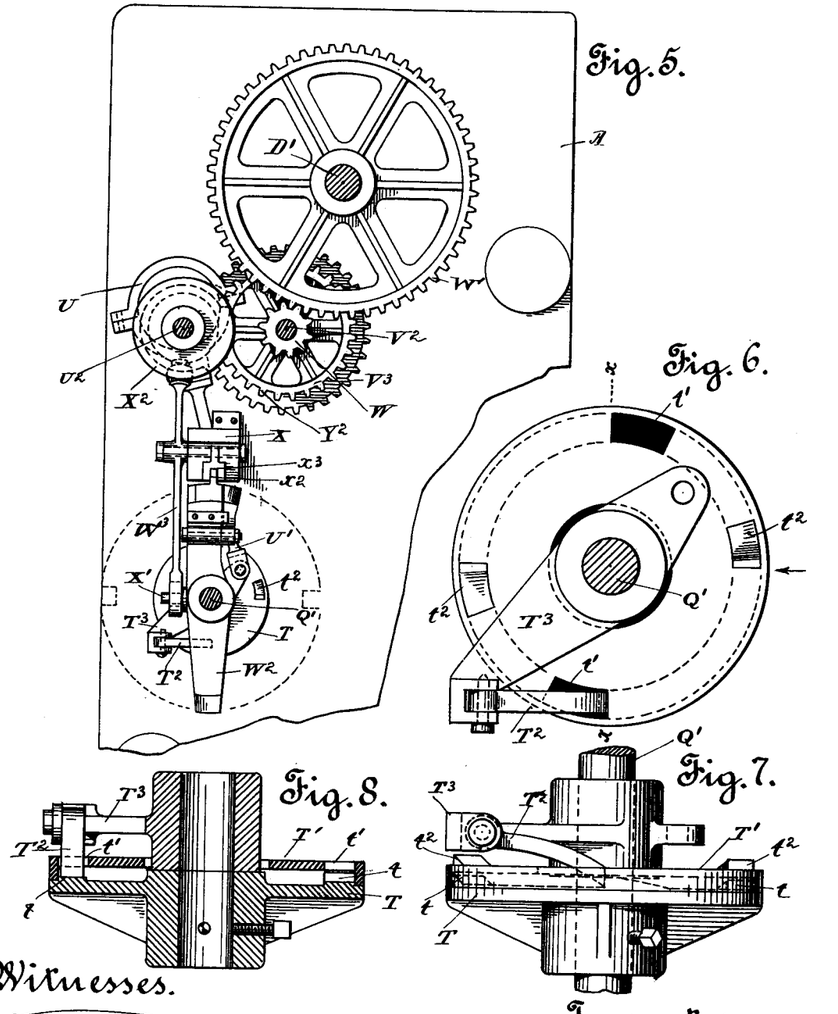
Fig. 5, a detail top plan of the mechanism for operating the turn-table or reversing mechanism for the cans.
Fig. 6 is an enlarged detail top plan view of the intermittently-rotating disks and pawl for rotating same, also showing vertical shaft for operating or rotating the turn-table or reversing device.
Fig. 7 is a side elevation of Fig. 6.
Fig. 8 is a cross-sectional elevation taken on line *x x*, Fig. 6, viewed in direction of arrows.

To the lower portion of the vertical shaft $Q'$ is secured the disk T, from the upper face of which project the teeth $t$, four in number. On top of this disk is placed the plate or disk $T'$. This plate is provided with two slots or openings $t'$ and two upwardly-projecting teeth $t^2$. The teeth of the lower and upper plates or disks are engaged by the pawl $T^2$ as the arm $T^3$, to which it is connected, is thrown forward. This arm works loosely upon the shaft $Q'$, and the free end thereof is connected to the eccentric U by eccentric-rod $U'$. When the two plates are in the position illustrated by Figs. 6, 7, and 8, the pawl $T^2$ engages with one of the teeth $t$ of the lower plate by passing through one of the openings in the upper one. Consequently as the eccentric-rod is thrown backward the outer end of arm $T^3$ is carried forward, which causes the pawl to likewise carry the lower plate, which being rigidly fixed to the shaft $Q'$ rotates the same and imparts a quarter throw to the turn-table Q. As the pawl is carried backward by the forward movement of the eccentric-rod the same rides over the upper plate and tooth and upon its forward movement carries this plate by engagement with one of the teeth forward a quarter-revolution, which quarter-revolution brings the next notch over one of the lower teeth, so that upon the next forward movement of the pawl both plates will be rotated. It will be noticed that the upper plate makes one complete revolution while the lower one makes a half-revolution. It is necessary that the upper plate be used as an idler, else the movement of the eccentric would impart too quick a movement to the shaft $Q'$. The eccentric is fastened to a sleeve $U^3$, which fits loosely over the vertical shaft $U^2$. To this sleeve is secured a pinion V, which meshes with gear $V^3$, fastened to lower portion of shaft $V^2$. This shaft receives motion from shaft $D'$ through the medium of pinion W, which meshes with large gear-wheel $W'$, secured to shaft $D'$. By means of the eccentric toothed plates and pawl an intermittent motion is imparted to the turn-table Q. Below the turn-table there is loosely fitted over the shaft $Q'$ the lift-plate $W^2$. This plate is a non-rotating one, but has a vertical movement upon the shaft. By means of the lever $W^3$, which is fulcrumed to the bracket X, this plate is raised and lowered. The outer end of said lever fits over the pin $X'$, projecting from the side of the plate. By means of the cam $X^2$, secured to shaft $U^2$, the inner end of the lever is lowered and allowed to rise, which raises and lowers the lift-plate. This cam is rotated through the medium of the pinion Y, secured to operating-shaft $U^2$, which receives its motion from gear $Y^2$, secured to shaft $V^2$. (See Figs. 4 and 5.) As the plate W is raised upon the shaft $Q'$ it lifts two of the rods R, so as to permit of a can being deposited in one of the reversing seats and a can removed from the opposite one. As one can is deposited the opposite one is removed. The moment the can is deposited within the seat and one removed the plate $W^2$ descends, which lowers the rods carrying the can-seats. When the plate is lowered its full distance, the ends of rods will be clear thereof and are thus free to be carried around by the movement of the turn-table. It will be noticed that this plate is raised and lowered during the interval which exist between the throws of the turn-table by the action of the eccentric before described. The movement of the turn-table through the medium of the eccentric mechanism and of the plate $W^2$ is so regulated that before the turn-table comes to a full stop the plate $W^2$ begins to lift. This is for the purpose of raising the same so as to receive the lift-rods of the next two can-seats. The ends of the plate I bevel or incline so as to permit the rods to gradually seat themselves upon the said plate, and at one end there is a shoulder $w$, which prevents the rods moving off the plate until the same has moved downward its full distance. In order to overcome jarring of the plate as the rods ride thereon, I movably secure to one end the pawl $Y'$. The outer end of this pawl is inclined, as shown at $y$, which is connected to the end of plate $W^2$ by the spring $X^3$. Consequently as the rod rides upon this inclined face the same slightly yields thereto. By this arrangement the movement of the turn-table is gradually stopped. From one end of plate $W^2$ projects the lip $x^2$, which fits within the guide-slot $x^3$, cut in the bracket X. This lip maintains the plate in true position.

Having thus described my invention, what I claim as new, and desire to secure protection in by Letters Patent, is—

1. In a can soldering machine, the combination with mechanism for receiving the cans, clamping the same at the ends thereof and carrying the same while thus clamped through the solder baths in order to solder the ends of the cans, of a rotatable device interposed between the solder baths for receiving the cans from the carrying mechanism after one end of the can has been soldered, reversing the can so as to bring the free or unsoldered end in line with the second solder bath, mechanism for imparting a step rotation to the reversing device and a device for releasing the can, after having one end soldered, so as to permit of its being deposited within the reversing device and reversed and causing the can to be grasped by the carrier mechanism, after being reversed, so as to be conveyed through the second solder bath.

2. In a can soldering machine, the combination with the endless can carrier mechanism, of rotatable can body clamps which receive and clamp the can body and cause the can body to be rotated as carried through the solder baths, of devices for swinging the carrier mechanism at an angle to the solder baths so as to permit the ends of the can to be carried therethrough, and causing the cans to be thrown in a vertical position after having passed through the solder bath in order that the solder may cool, and an independent intermittent rotatable device interposed between the solder baths for reversing the position of the cans before entering the second bath.

3. In a can soldering machine the combination with the solder baths, the can carrier mechanism, which automatically receives the can bodies and clamps the ends thereof and rotates the same through the solder baths and an independent and automatically intermittently rotatable device located between the solder baths for reversing the position of the can so that the unsoldered end will be placed in position to be passed through the second solder bath.

4. In a can soldering machine for soldering the ends of can bodies, the combination with the can carrying mechanism, device for feeding the can bodies to the carrying mechanism, devices suspended from the carrying mechanism for automatically clamping the can bodies at their ends and holding the same so clamped during the operation of soldering of an independent and automatically operated device located between the solder baths for receiving the cans from said mechanism and for reversing the position thereof in order that the unsoldered end may be placed in line to be soldered, and devices for releasing the can bodies after one end has been soldered and clamping the same after being reversed.

5. In a can soldering machine, the combination with the endless carrier belt or chain, wheels over which the same travels, mechanism for imparting motion to one of said wheels, can holding devices suspended from and carried by the carrier belt, said devices connected thereto so as to have a lateral swing, devices for causing the holding devices to move from a horizontal to an inclined and to a vertical position and vice versa, mechanism for causing the can holding device to automatically grasp the cans and to release the same, and an independent and automatically rotatably operated device for reversing the position of the can as carried from one solder bath to the other.

6. In a can soldering apparatus, the combination with the solder baths, the endless carrier belt or chain, mechanism for imparting motion thereto, the swinging devices suspended therefrom which carry the cans, devices for throwing the can carrying devices into different positions, feed wheel for supplying cans to the apparatus, mechanism for opening the can carrying devices in order to discharge cans therefrom and closing the same in order to grasp a can therein, and mechanism interposed between the solder baths for reversing the position of the cans as conveyed from one bath to the other.

7. In a can soldering apparatus, the combination with the endless carrier chain or belt, carrier frames suspended therefrom, said frames being permitted a lateral movement, can clamps carried by said frames, devices for automatically opening and closing the can clamps in order to release cans therefrom and grasp cans therebetween, and mechanism for automatically reversing the position of the can bodies during the continuous travel of the endless carrier belt or chain.

8. The combination with the endless carrier chain or belt, swinging carrier frames suspended therefrom, clamp heads held therebetween by clamp rods, rolls secured to the outer ends thereof, endless tracks upon which the rolls travel so as to rotate the clamping heads in order to revolve the cans held between the clamp heads, said tracks being so arranged as to cause the carrier frames to be thrown or swung into different positions, devices for automatically opening and closing the clamp heads so as to discharge the can therefrom and grasp the can therebetween, an independent reversing device which receives the can bodies from the clamp heads after one end of the can body has been soldered and reverses the position of the can body so that the free or unsoldered end will be in line with the second solder bath, and of mechanism for imparting a rotary motion to the reversing device.

9. In a can soldering apparatus, the combination with the feed chute, the rotatable wheel for receiving the cans from the chute and carrying the same to the apparatus, the endless traveling carrier belt, swinging can carrying devices suspended therefrom, said devices adapted to engage with and rotate the feed wheel as carried thereover by the movement of the endless belt, can clamps connected with the swinging devices, and mechanism for closing said clamps in order to grasp a can and open the same to discharge the can therefrom.

10. In a can soldering apparatus, the combination with the feed chute, the rotatable feed wheel for receiving cans therefrom and conveying the same to the apparatus, the endless traveling carrier belt or chain traveling thereover, and devices suspended from the belt or chain which engage with and impart motion to the rotatable wheel and grasp the can carried by the wheel.

11. In a can soldering apparatus, the combination with the feed or delivery wheel composed of a series of disks, the inner disks having can body seats cut within the periphery thereof, the outer disks serving as flanges for ends of the can seats, the outer disks having the periphery thereof serrated, the can body feed chute for supplying the can bodies to the delivery wheel, the endless carrier belt or chain traveling above the wheel, swinging can carrying devices suspended from the endless belt or chain, clamping heads carried thereby, said can carrying devices adapted to engage with the rotatable carrier wheel, and devices for opening and closing the clamping heads.

12. In a can-soldering apparatus, the combination with the feed chute for supplying can-bodies, of the rotatable carrier wheel having a series of can seats cut within the periphery thereof for receiving the cans, of a guard plate for holding the can-bodies within their seats, of an endless carrier arranged above the carrier wheel which engages with the wheel and imparts rotary motion thereto and of devices suspended from the endless carrier which during the movement thereof grasp the can-bodies seated within the carrier wheel and remove the same from their seat.

13. The combination with a soldering apparatus, of a rotatable carrier wheel for delivering cans thereto, said wheel composed of four flanged disks, the flanges of the inner ones having can seats cut therein, the flanges of the outer ones serving as guards to prevent lateral displacement of the cans, a feed chute for supplying cans to the rotatable wheel, a guard plate for holding the cans in their seats during rotation of the wheel, the endless carrier belt or chain, swinging devices carried thereby for imparting motion to the carrier wheel and removing the cans therefrom, and mechanism for opening and closing the can carrying devices in order to release the cans and clamp the same therein.

14. In a soldering apparatus, the combination with the carrier chain or belt, of the swinging frames suspended therefrom, the rotatable can clamping devices carried thereby, cam mechanism for opening and closing said clamping devices, the solder baths through which the can bodies are conveyed, and the reversing mechanism which receives the can bodies from the clamping devices after one end has been soldered and reverses the same so that the can body when again grasped by the clamping devices will be carried along with its unsoldered end in position to be carried through the second solder bath.

15. In a soldering apparatus, the combination with the endless carrier belt or chain, said chain consisting of male and female link rods, pins for coupling the rods together, said pins extending above and below the link rods, and wheels over which said chain travels, said wheels being provided with radial arms, the ends of which are notched to receive the projecting ends of the coupling pins of the endless chain, mechanism for imparting motion to one of the drive wheels, the swinging can carrying devices suspended from the endless belt or chain, a feed wheel for supplying can bodies to the can carrying devices, said wheel rotated by the travel of the endless carrier belt or chain, and devices for automatically opening and closing the can carrying devices.

16. The combination with a machine for soldering both ends of cans, the solder baths, mechanism for conveying the cans through the baths at an angle thereto, devices carried by said mechanism which grasp the can bodies and impart a rotary motion thereto as carried through the solder baths and independently operated mechanism interposed between the solder baths which receive the can bodies after one end has been soldered and automatically reverses the position thereof in order that the free or unsoldered end may be in position for passing through the second solder bath.

17. An apparatus for soldering both ends of a can, which consists of two solder baths, mechanism for receiving the can and rotating the same through the first solder bath at an angle thereto and afterward carrying the same in a vertical position until the solder is cooled, thence placing the same in a horizontal position, devices for releasing the can from the can carrying mechanism and holding the said mechanism open until the position of the can has been reversed, mechanism for receiving the can when released and reversing the position thereof in order to place the unsoldered end in position to be soldered by the second solder bath, device for closing the can carrying mechanism after the can has been placed therein in a reversed position, and of a device for releasing the can in order that it may be discharged from the machine after having passed through the second bath.

18. In a can soldering apparatus, the combination with the can carrying mechanism, the automatically operated reversing mechanism, can body seats carried by said mechanism for receiving cans from the can carrying mechanism after one end has been soldered, a device for causing the can carrying mechanism to open and deposit the can within the seat and remain open until the position of the can has been reversed, and to close so as to automatically grasp the can body after having been reversed and mechanism for causing the rotary and intermittent travel of the reversing mechanism and can seats in order to reverse the position of the can deposited therein.

19. In a reversing device for can bodies, the combination of the can seats, the lift rods to which the seats are secured, the table or disk through which the rods work, mechanism for rotating the disk, and devices for raising and lowering the lift rods.

20. The combination with the lift rods, swinging seats secured thereto, table or disk through which the rods work, shaft to which the table or disk is connected, mechanism for imparting an intermittent motion to the shaft, the plate loosely secured upon the rotatable shaft, and mechanism for imparting vertical movement to the plate so as to raise or lower the can seats through the medium of the lift rods.

21. In an apparatus for soldering both ends of a can, mechanism for receiving and carrying the cans through the solder baths, the reversing mechanism interposed between the baths, the swinging can seats carried by said mechanism, devices for releasing the can carrying mechanism in order to deposit the cans within one of the swinging seats and maintaining the same open until the can has been reversed, and a device for closing the can carrying mechanism after the can has been reversed, in order to remove the can from the can seat.

22. The combination with the reversing mechanism of a can soldering apparatus, of a rotatable table, lift rods extending above and below the same, shaft for rotating the table, can seats connected to the upper end thereof, plate loosely secured upon the shaft for raising and lowering the lift rods and can seats carried thereby, fulcrumed lever for operating the plate, cam for throwing the fulcrumed lever up and down, mechanism for rotating the cam, and devices for imparting an intermittent motion to the shaft to which the table is secured.

23. The combination with the reversing mechanism, the rotatable shaft, toothed disk secured to the lower end of the shaft, plate loosely fitted over the shaft and upon the toothed disk, openings cut through the said plate, teeth projecting above the face of same, sleeve loosely fitted upon the shaft and working above the plate, pawl carried thereby which rotates the toothed disk and plate, and the eccentric mechanism for imparting motion to the ratchet.

24. In an apparatus for soldering both ends of a can, the combination with the solder baths, mechanism for automatically clamping the ends of the can bodies and imparting a rotation to the clamped can bodies and carrying the same while thus clamped and rotating through the solder baths, devices for automatically opening and closing the clamping mechanism, independent reversing device interposed between the solder baths for receiving the cans after having one end soldered and reversing the position thereof so as to bring the free or unsoldered end in line with the second bath, and mechanism for imparting an intermittent motion to the reversing device.

25. The combination with the rotatable table of the can reversing device, the lift rods working through said table, the plate for raising and lowering the lift rods, so as to raise and lower the can seats secured to the upper end thereof, mechanism for rotating the table and lift rods, the spring actuated pawl secured to one end of the lift plate, said pawl being for the purpose of permitting the lift rods to gradually enter upon the lift plate so as to prevent jarring, and mechanism for raising and lowering the lift plate.

26. In an apparatus for soldering both ends of cans, the combination with the endless traveling belt or chain, solder baths, swinging can carrier frames suspended from the chain or belt, clamp heads carried by the frame, spring actuated slide rod connected to one of the clamp heads, cam roll for forcing the connected head outward in order to release the can held between the heads, cam rod upon which the cam roll travels, tracks for swinging the carrier frames laterally, rolls secured to the outer ends of the clamp head rods which travel over said tracks and impart rotary motion to the heads, and the keeper roll connected to the swinging frames, the rotatable feed roll for supplying can bodies to the clamp heads, the solder baths through which the can bodies are carried, and an automatically operated reversing device located between the solder baths.

27. In a machine for soldering both ends of cans, the combination with the solder baths, can carrying mechanism for conveying the cans through the solder baths, rotatable clamping devices carried by said mechanism for engaging the ends or heads of the cans and holding the same firmly upon the body in order that the same may not spring therefrom by the heat of the solder, and an automatically operated device located between the solder baths which receives the cans after one end has been soldered and reverses the same so as to place the unsoldered end in position to be conveyed through the second solder bath.

In testimony whereof I affix my signature in presence of two witnesses.

HENRY SCHAAKE.

Witnesses:
N. A. ACKER,
LEE D. CRAIG.